Figure 1:
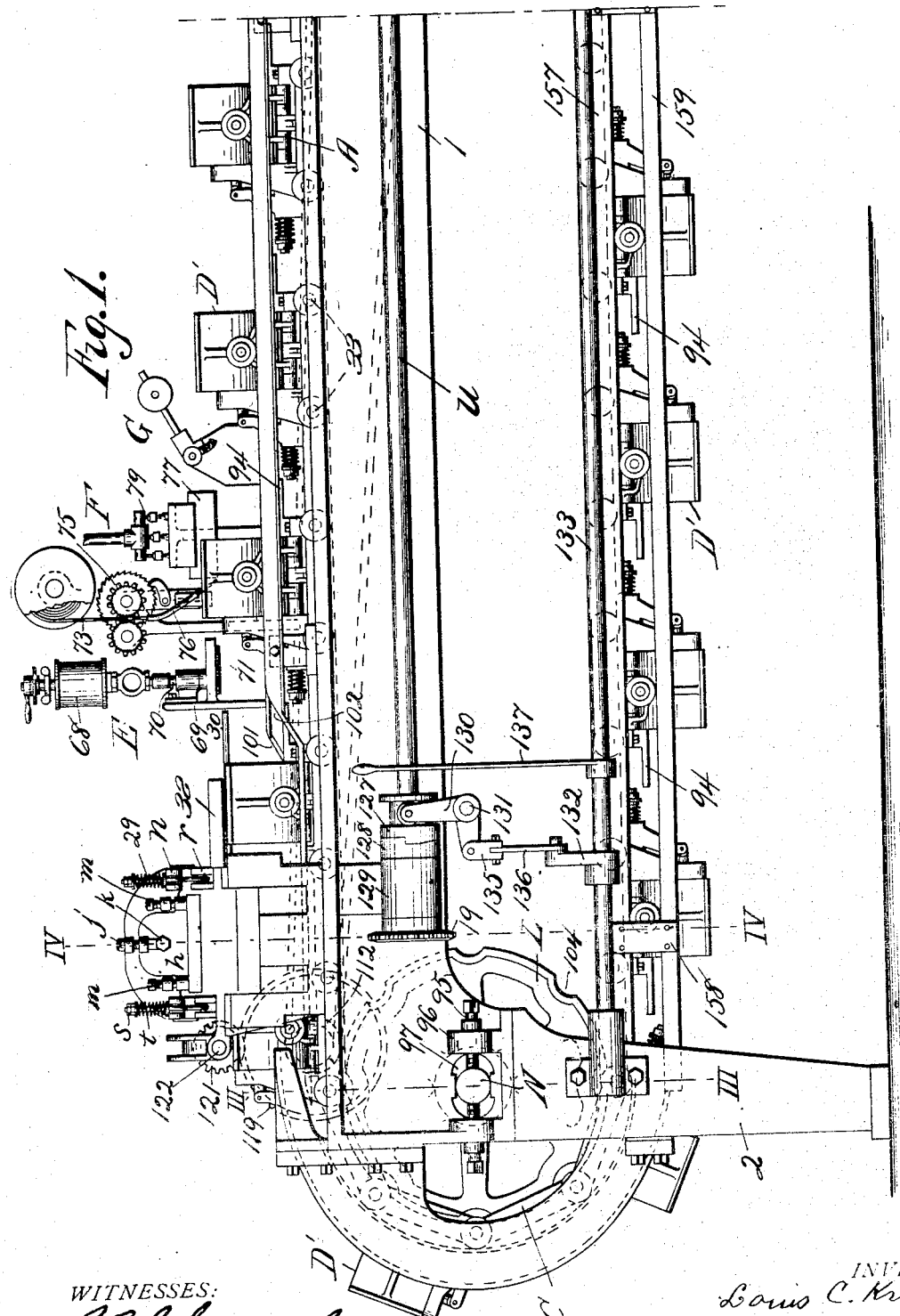

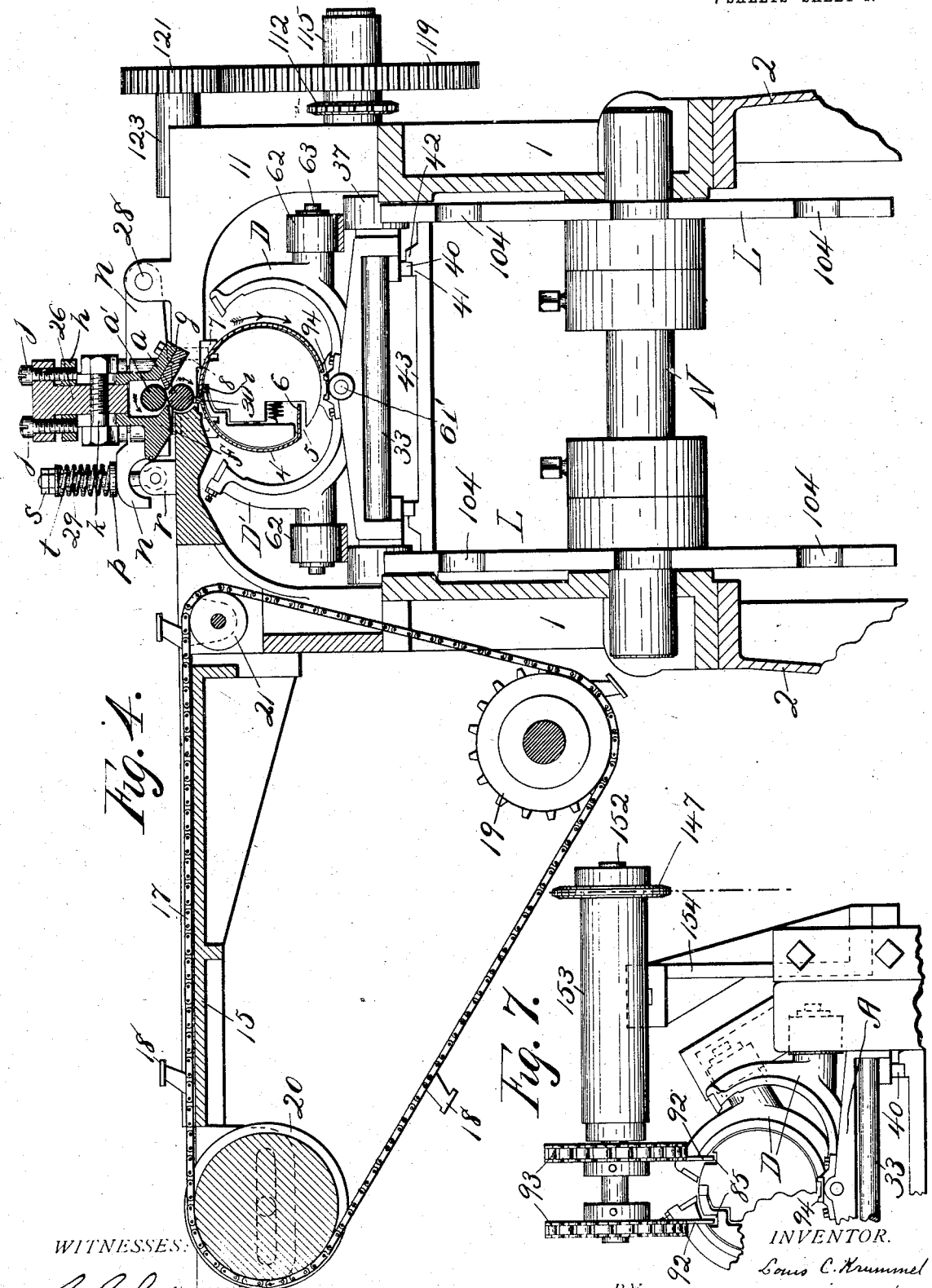

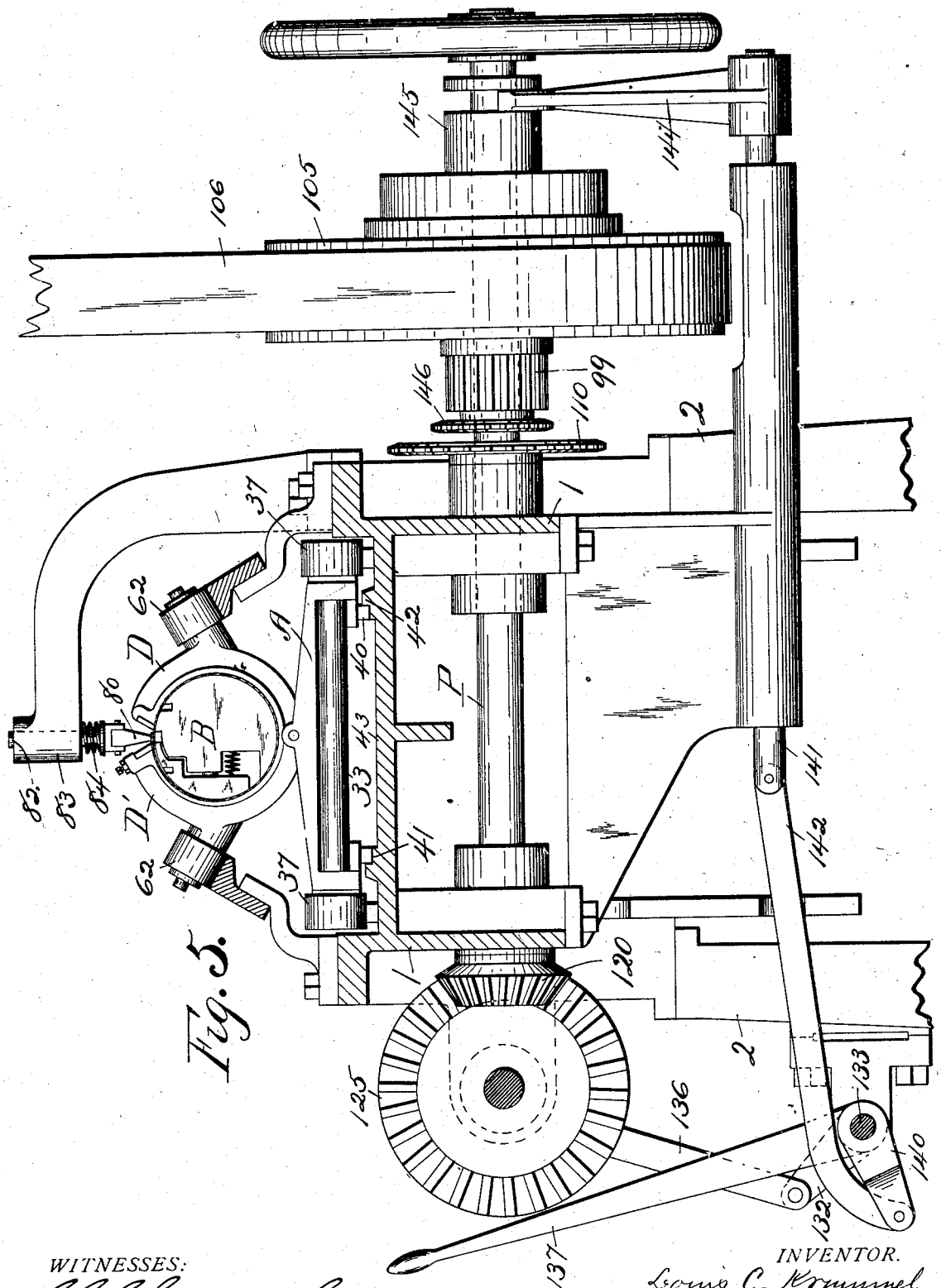

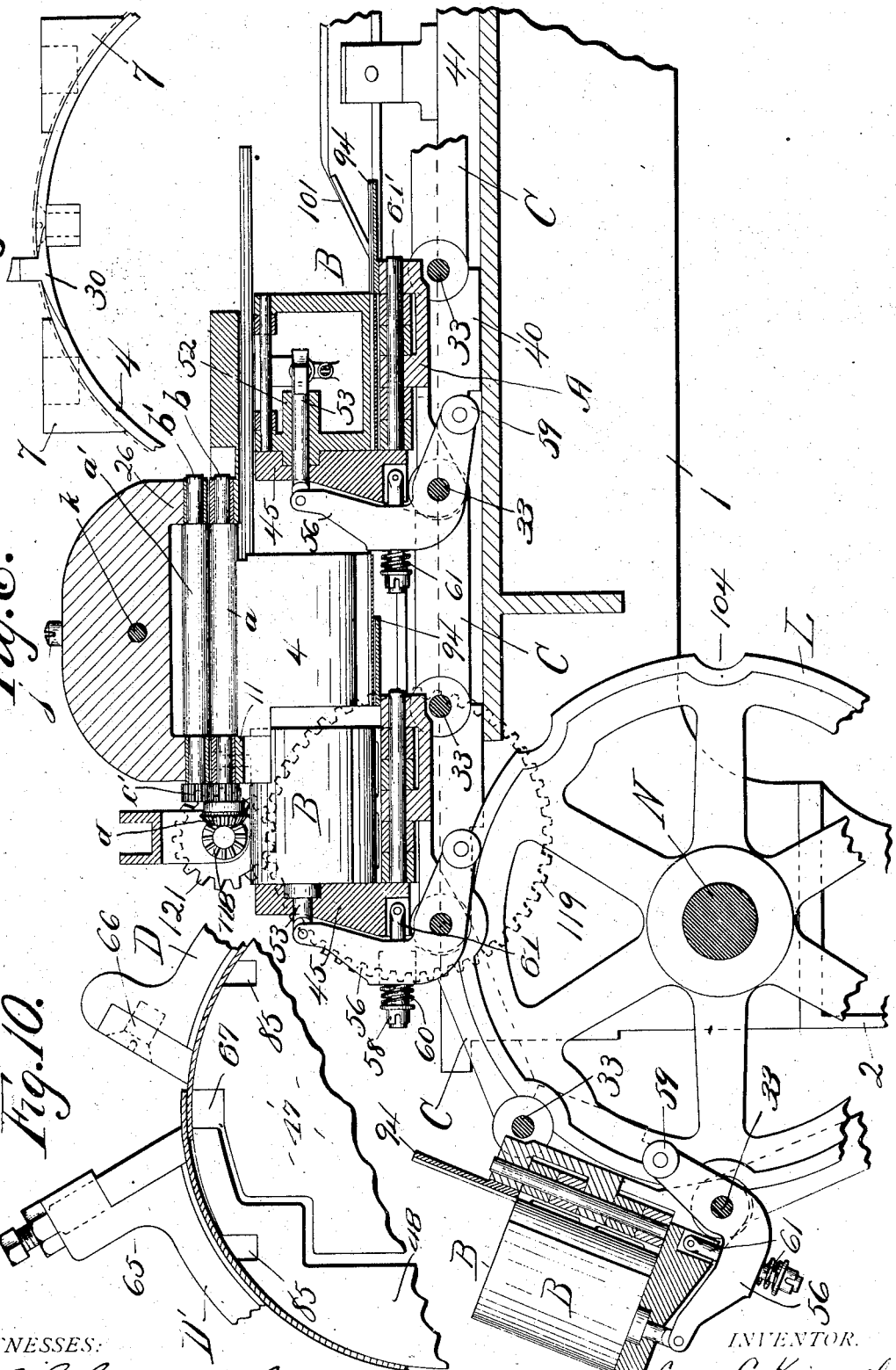

L. C. KRUMMEL.
LAP SEAM BODY FORMER.
APPLICATION FILED AUG. 24, 1907.

934,191.

Patented Sept. 14, 1909.
7 SHEETS—SHEET 7.

WITNESSES:

INVENTOR.
Louis C. Krummel
BY
Alfred Wilkinson
ATTORNEY.

UNITED STATES PATENT OFFICE.

LOUIS C. KRUMMEL, OF CLINTON, CONNECTICUT.

LAP-SEAM BODY-FORMER.

934,191.  Specification of Letters Patent.  Patented Sept. 14, 1909.

Application filed August 24, 1907. Serial No. 390,026.

*To all whom it may concern:*

Be it known that I, LOUIS C. KRUMMEL, a citizen of the United States, residing at Clinton, in the county of Middlesex and State of Connecticut, have invented new and useful Improvements in Lap-Seam Body-Formers, of which the following is a specification.

My invention relates to a lap-seam body former for can bodies, and has for its object rapidly and automatically to form the blanks into the cylindrical bodies for cans having a lap seam, and soldering the seam.

The important features of my invention are a hollow shell fixed on some suitable part of the machine and means, such as a pair of rapidly rotating rollers, for receiving the can bodies in rapid succession and wrapping them around said shell into the cylindrical form of body with the side edges slightly overlapping. Means must be provided, such as a gage, whereby the position of the seam on the shell, while the body is passing through the machine, is positively regulated. A series of substantially cylindrical horns are provided, arranged respectively on a series of trucks forming an endless chain, and adapted each in turn to strip off a formed body from the shell and to maintain it firmly in position, while the various steps of fluxing, soldering and completing the seam or joint are effected. When this has been completed, the bodies are stripped or removed from the horns by a special mechanism which I have devised. Means must be provided for expanding and contracting the horns, first to fit snugly within the bodies, and then to be loosened so that the bodies may be removed.

Other features of my invention lie in the form, construction, arrangement and details of the various parts of the machine, though it will be understood that there is nothing broadly new in the construction of the fluxing, soldering, cooling and reheating mechanisms.

My invention is fully shown in the drawings herewith in which the reference letters and numerals of the description indicate the corresponding parts in all the figures.

Figure 2:
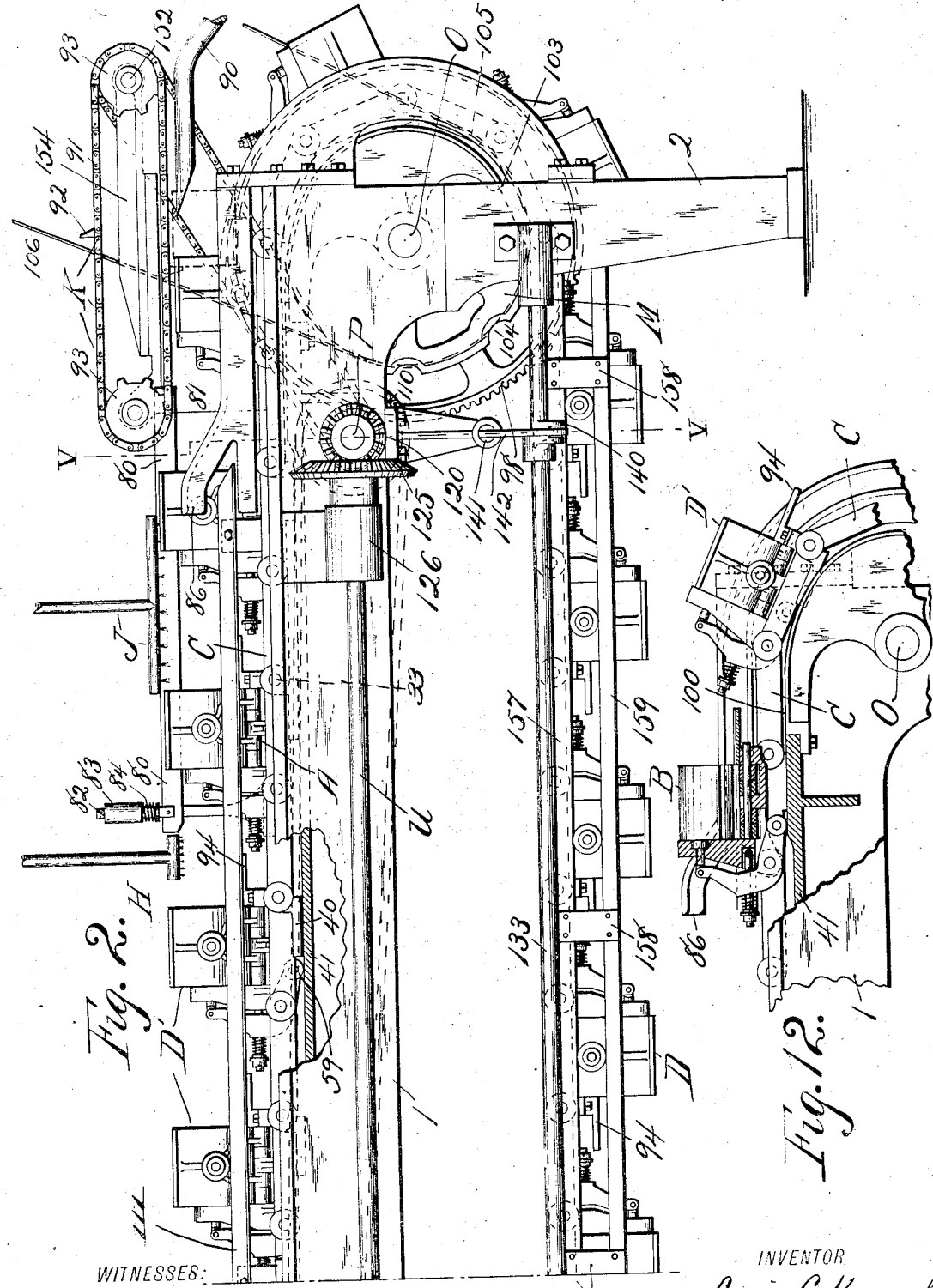
Figure 3:
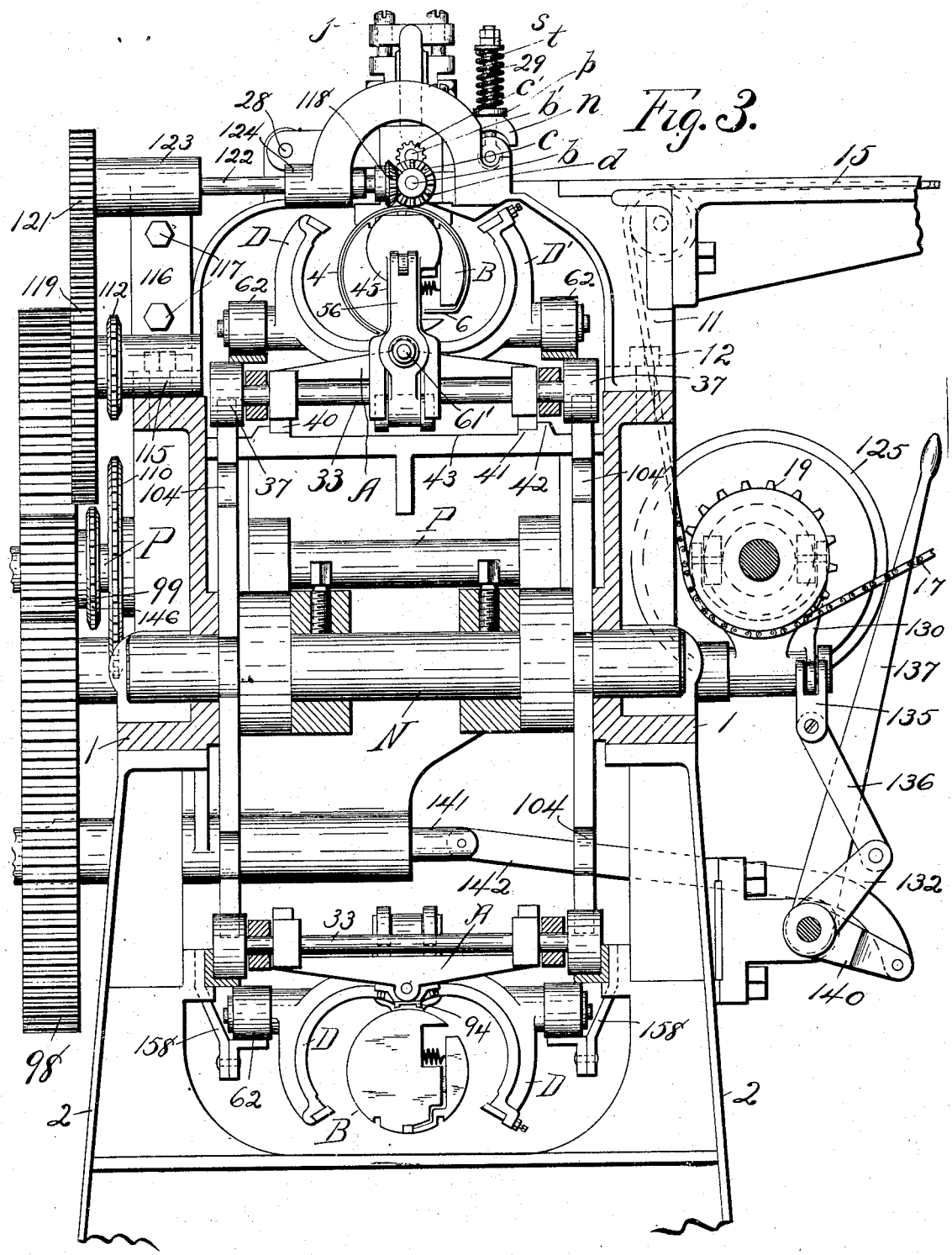
Figure 8:
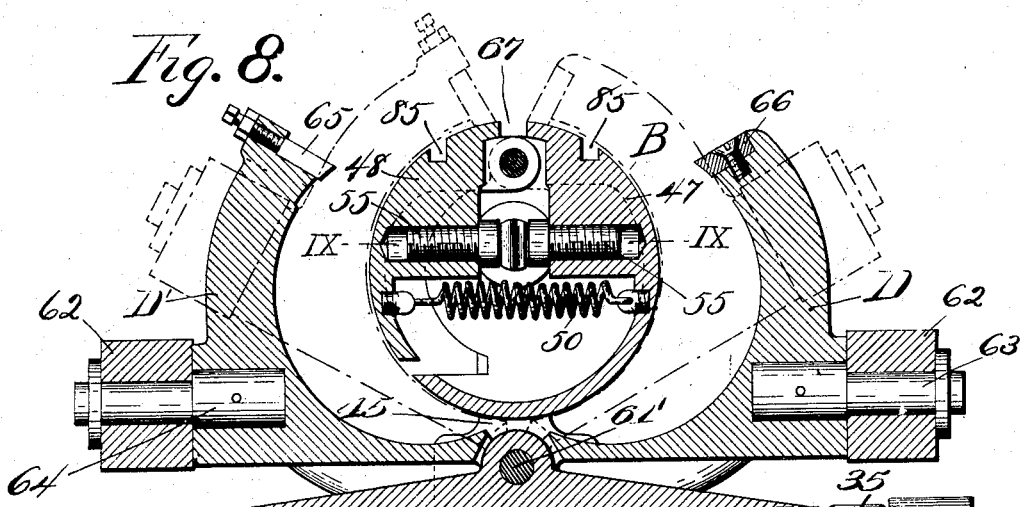
Figure 9:
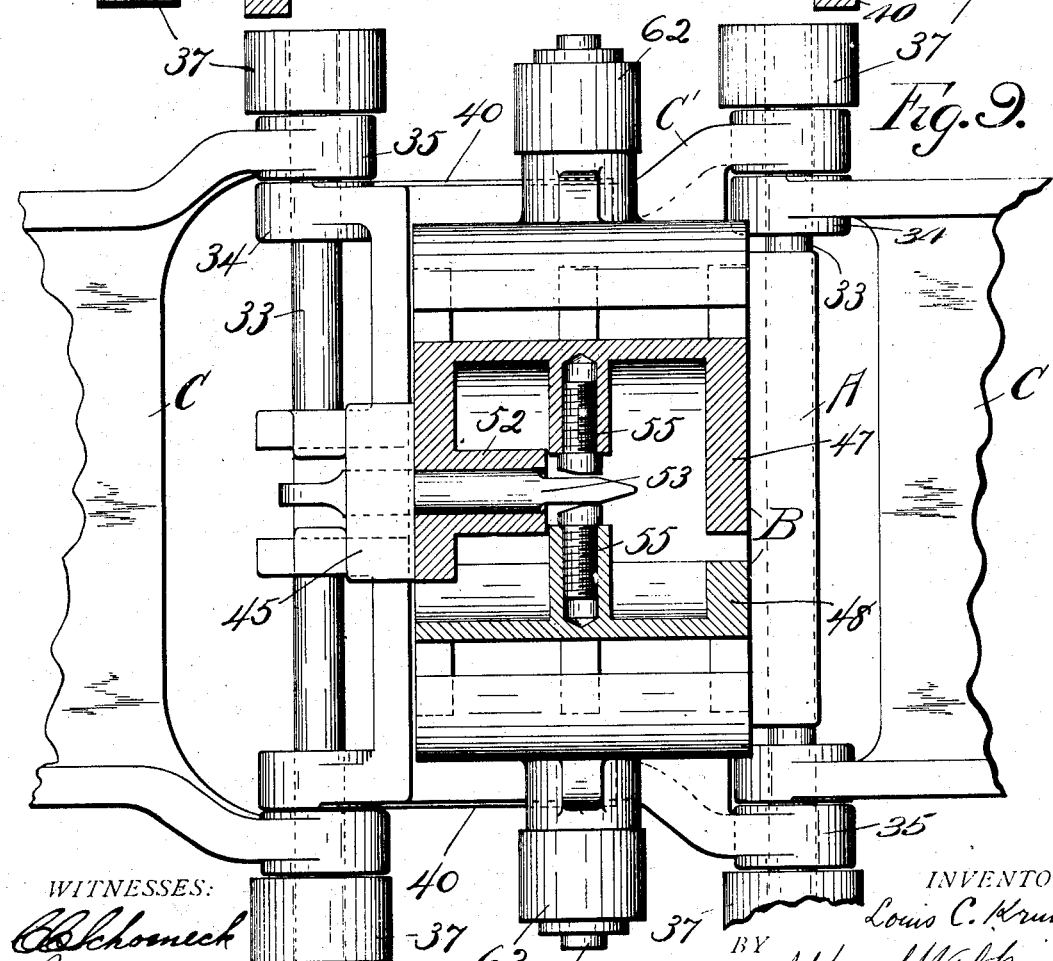

Figures 1 and 2 form together a side elevation of the complete machine with portions broken away. Fig. 3 is substantially an enlarged, front elevation of the machine, but for clearness is taken as a vertical section on line III III of Fig. 1 looking toward the rear. Fig. 4 is a vertical cross section, on a similar scale to Fig. 3, taken on a line IV IV of Fig. 1 and looking toward the front. Fig. 5 is a cross section on a similar scale taken on line V V of Fig. 2 and looking toward the front. Fig. 6 is an enlarged, longitudinal, vertical section of a portion of the front end of the machine, showing one of the trucks in elevation. Fig. 7 is a partial, rear elevation of the upper portion of the machine to illustrate particularly the stripping mechanism. Fig. 8 is an enlarged, vertical cross-section of one horn and pair of jaws. Fig. 9 is a cross section of Fig. 8 on line IX IX with the jaws removed. Fig. 10 is an enlarged, partial rear elevation, showing the position of the arms and the dies when holding the cylindrical body on the horn. Fig. 11 is a similar cross section to show the function of the gage. Fig. 12 is an enlarged partial view of the rear end of the machine, being partly in side elevation and partly in longitudinal section.

In the figures, 1 indicates the frame of the machine having suitable legs 2. At some point near the front of the machine is fixed the hollow shell 4, formed as best shown in Fig. 4, with the opening 5, for the passage of the horns on the trucks, and with the inturned edge 6 to prevent the tin sheet, or body blank, which is being wrapped by the operation of the rollers around the shell in the direction of the double arrow, from passing into the interior of the shell, but to cause the blank to maintain its proper position on the exterior. This shell may be supported in any suitable manner as by lugs 7 and bolts 8, below the central inner portion of the lower bracket 11, which is secured on the upper surface of the frame 1 on each side by bolts 12.

The sheets or body blanks may be fed one by one by hand to the mechanism for rolling them on the shell, but preferably are fed by some suitable blank feeding mechanism as best shown in Fig. 4, which may consist of a table 15 arranged on one side of the machine frame in line with the fixed shell 4. Along the top of said table, or in a suitable groove therein, is operated by means to be described an endless carrier chain 17 having fingers 18, to engage with the blanks, and fitted to a sprocket 19 and rollers 20 and 21. By the carrier chain the blanks are fed one by one to the folding rollers *a* and *a'*, journaled respectively in lower and upper brackets 11, 26, and rotated together in opposite directions at a high rate of speed, as indicated by arrows in Fig. 4, whereby the blanks are received from the carrier and folded around the shell 4. Roller *a* is journaled by its axles *b* in suitable bearings in said lower bracket and is provided at one end with pinion *c* and beveled pinion *d* whereby the rollers are rotated from the general driving means to be described. Roller *a'* is similarly journaled in upper bracket 26 by its axles *b' b'* having at the front pinion *c'* in mesh with pinion *c*. For foregoing see particularly Figs. 3, 4 and 6. Said upper bracket 26 is hinged as a whole to ears 28 28, so that it and all its parts may be swung out of the way, affording access to the lower rollers, etc. as for the purpose of removing a blank, which may sometimes catch or jam. On the upper bracket is arranged in front of the rollers a leading-bar *f* to guide the blanks true to the rollers, and, at the rear, the inclined guide-bar *g* to turn and deflect the front edges of the blanks downwardly and against the shell, so that they will curl around it. Said leading-bar and guide-bar are made a part of, or fixed on, a carrier *h*, which is vertically adjustable on the upper, or swinging, bracket, to adjust the bars in correct relation to the rollers and slightly to vary their position as for blanks of different thicknesses, by means of adjusting screws *j j* and *m m*. As best shown in Fig. 4 screws *j j* are arranged in the top of the upper bracket 26 to engage with the upper portion of the carrier *h*, vertically to adjust said carrier and the bars *f* and *g* with relation to the space between the rollers. As best shown in Fig. 4, screws *m m* are arranged in the bracket 26 to engage with the front and rear ends of the carrier to insure the arrangement and maintenance of the bars *f* and *g* true and parallel to the rollers.

The upper bracket is locked to maintain said bars and upper roller in proper position by means of the forked, or perforated, ends of arms *n*, with which engage sliding collars *p* on bolts 29 hinged to ears *r* on the lower bracket, and provided with screw-heads *s* and tension springs *t*, whose pressure or tension on the nut may be regulated by the screw-heads, to regulate the tension of the upper roller on the blank and to permit the roller to adjust itself to blanks of varying thicknesses.

31 is a bridge-piece for connecting the front and back portions of the swinging bracket.

30 is a gage extending rearwardly from the shell, whose purpose is to engage the front edge of the blank as it is coiled around the shell, and to maintain the longitudinal joint edges parallel and slightly separated and to fix the position of those edges, so that when the blank is stripped off the shell on to the horn, the edges in all cases will be in exactly the same position, and the operations or soldering etc. be effected with certainty, as shown in Figs. 1, 6 and 11.

As particularly shown in Figs. 8 and 9, A A are a series of trucks or bases carrying the horns B, and connected by links C C to form an endless chain, whereby the body blanks coiled on the shell in cylindrical form are continuously removed therefrom and carried rearwardly to be subjected to the various operations, whereby a perfect soldered lap joint is produced. Each truck is provided with a base A, similar in form to the intermediate connecting links C. In said bases are arranged axles 33 33 for connecting the two sets of links by means of their ears 34 and 35. On the axles are arranged the rollers 37 37, to drop into the pockets of the driving sprocket wheels, whereby the chain of trucks is driven. On the truck bases are the shoes 40, which ride on the tracks 41. These shoes being flat and elongated are less subject to wear than rollers (which would soon get out of true), and being well greased and the trucks not heavy, there is little friction. As shown in Fig. 4 the tracks are shouldered at 42 to maintain the trucks and shoes in line and may be cut away or left unfinished at their centers 43.

On the truck piece C' is supported the horn consisting of the post portion 45 and the cylindrical portion B. Said post is set at about the front end of the truck base and is arranged to pass through the opening in the shell and thereby to engage with the blank and to strip the latter from the shell. The cylindrical portion of the horn may be arranged to project rearwardly from the post and may desirably be formed as shown—of a main member 47 secured directly on the post; a smaller, or loose, member 48 is fitted to the main member and secured thereto by one or more tension springs 50, whereby the horn may be contracted at the proper time, making it easier to strip the soldered body therefrom.

To expand the horn to full size, there is fitted in a bearing 52 in the main portion of the horn an expanding pin 53, having a tapered tip and adapted to be forced rearwardly between the heads, correspondingly beveled if desired, of two hard steel screws 55, one on each member of the horn. The forward or outer end of this expanding pin is connected to the upper arm of a bell-crank lever 56 (Fig. 6,) pivotally supported on the truck base A on 33 and normally forced rearwardly to expand the horn by pressure of spring 60 on pin 61, hinged to post 45. A nut is fitted to this pin to adjust the tension of the spring. The lower arm of this lever 56, is provided with a roller 59, adapted to strike the track 100, after the body joint has been completed, whereby the roller arm of the lever is elevated, the expanding pin retracted and the spring 50 left free to contract and loosen the horn. The horn is self collapsing but the spring assists and holds the parts together. As the horn carrying the body emerges from the shell, there are swung up against the sides of the horn, to hold the body in place firmly thereon, the jaws D and D' journaled on the bearing 61' in the truck base (in Fig. 8 the closed position is indicated in dotted lines). These jaws are swung by means of the wing rollers 62 62, carried on the axles 63 63, set eccentrically on their integral pins 64, whereby the rollers may be adjusted for lost motion, for holding the bodies tighter etc. The pins may be secured in position by suitable means, for instance the set screws, whose position is indicated in Fig. 8 by the small circles on the pins 64. Jaw D is first rocked in to hold the blank, by its roller 62 striking high point 101 on one of the tracks; jaw D', immediately thereafter by its roller striking the high point 102 on the other track. (Fig. 1.) 65 and 66 are dies on the ends of the jaws for engaging with the blank on each side of the seam, which is maintained over an air space 67 in the horn, so that the seam portion can be easily heated and the solder follow around the edge. Die 65 is preferably adjustable, as shown, by means of a set-screw and lock nut. The truck carries the can body first under a fluxing mechanism E which may be of any suitable construction, for instance a vessel 68 on a supporting arm 69 from which the flux flows through a tube 70 to a felt pad or roller 71 whereby it is applied along the can seam. (Fig. 1.) Next the body is carried under a soldering mechanism F of any suitable construction, for instance, a solder wire 73 drawn out from the coil by the ratchet-and-roller mechanism 75 through a tubular guide 76 to strike the front of the iron 77 on which a gas jet impinges. The solder is fed along the seam as the can body passes under, and the body then passes under the soldering iron heated by burner 79, whereby the solder is smeared along the seam and follows the flux under the edge. Immediately from the soldering mechanism, the body passes under the wiper G (indicated in Fig. 1), having a piece of felt or other suitable material to wipe off the surplus solder. The body then passes through the flame of the reheater H. in order thoroughly to soak the solder into the joint, whereby also any remaining solder is smoothed. (Fig. 2). While this is being done, the lap is held down by the holding bar 80, centered at its rear end on rear bracket 81 and resting by its weight on the body; its front end is held down by the plunger 82 of a standard 83 under the spring tension of a spring 84. The body may then pass under a cold air blast J, or other means for cooling the seam, if desired. Immediately thereafter the arms are swung away from the horn by the engagement of the rollers 62 with the depressing track 86; the main tracks 111 here terminate. The plunger 53 is then retracted by the engagement of the bell-crank roller 59 with the high point 100, and the horn is contracted leaving the body loose to be stripped off by the stripping mechanism K and delivered on to the discharge rod, 90, which guides it to any suitable receptacle or other machine. The track 100 terminates below at about 103 whereupon the horn is again tightened to normal size and may be submitted to a brush, etc. to be cleaned if desired.

This stripping mechanism (Figs. 2 and 7) consists of endless chains 91 having fingers 92 and operated on sprockets 93 93 at a higher rate of speed than the drums, for instance, twice the speed. Evidently the fingers engage with the body then loose on the horn and easily strip it off. The grooves 85 in the horn afford a path for the fingers, 94 is a bridge piece below each horn to hold the body true, so that it will not tilt and bind, but will strip easily.

*Operating shafts, gears, and connections.*—L and M are respectively front and rear pairs of sprockets, formed to receive the truck axles in their peripheral pockets 104, and adapted to operate the endless chain of trucks. Sprockets L are fitted to turn on the shaft N, longitudinally adjustable in slots 97 by set-screws 95 supported in ears 96, to adjust the tension of the chain. The sprockets M are on the shaft O, which also carries a large gear 98 meshing with a pinion 99 on the driving shaft P, whereby the chain of trucks is driven. Power is applied to the driving shaft in any usual way as by pulley 105 and belt 106.

110 is a sprocket on said driving shaft connected by a chain to a sprocket 112 on a stud in the bearing 115 on the stud bracket 116, secured to the aforesaid lower bracket by bolts 117. 119 is a gear fixed on said stud and in mesh with a gear 121 on the roller shaft 122, arranged in bearings 123 and 124, respectively on the stud-bracket 116 and the lower bracket 26, and carrying a bevel pinion 118 meshing with the bevel pinion $d$, on the lower roller axle $b$, whereby the rollers are driven. As will be seen, the parts are geared up so that the rollers are driven at a high rate of speed, often desirably over 1000 per minute.

120 is a bevel gear on the driving shaft P meshing with bevel gear 125 on the feed drive shaft U in bearings 126 and 129, carrying the grooved clutch member 127 or sliding collar, fitted to slide on shaft U by a feather. The other clutch member 128 is on a tubular shaft in bearing 129, carrying at its front end the sprocket 19 of the blank feeding mechanism shown in Fig. 4. Said clutch member 127 is moved into and out of engagement by the bell-crank clutch lever 130 hung at 131 and connected to the arm 132 on a rock-shaft 133 by links 135 and 136. On this rock-shaft in line with the driving shaft there is fastened a second arm 140, which engages with the belt-clutch shifting-rod 141 through a link 142; on this shifting-rod is a fork arm 144 engaging with a clutch collar 145 to throw the belt clutch into or out of engagement. When thrown out, the whole machine is stopped.

The arms 132 and 140 are so arranged on the rock-shaft 133 that the first clutch is disengaged before the belt-clutch, and the feed mechanism thus stopped before the machine. The rock-shaft is operated by hand lever 137. On the drive shaft P is a sprocket 146 connected by a chain to a sprocket 147 on the stripper shaft 152 in the bearing 153. Said bearing is fitted by means of a tongue and groove to the bracket 154 bolted on the machine frame, so that the bearing may be longitudinally adjusted to tighten the chains. The sprockets 93 may be adjusted to or from each other on said shaft 152 for different sizes of horns and cans.

On the under side the track 157 supports the trucks, while the track 159, carried on braces 158, holds the wings. Thus as they return below, the trucks and horns may be inspected, cleaned etc.

The operation of the entire mechanism will be understood from the preceding description, but I desire to call attention to the details of the horn, whereby perfect soldering of the joint is effected, and at the same time impurities are excluded from the interior of the can. The air space, or groove, 67 in the top of the horn permits quick soldering of the joint under the soldering iron. The metal horn operates as a cooler, also the dies, so, without the air space, there would not be enough heat to permit the solder to flow properly. As shown in Fig. 10 the under edge of the lap extends across the groove and engages with the loose member of the horn for a short distance, for instance one-sixteenth inch. This under edge is thus cooled by contact with the horn and cannot be heated sufficiently in the time allotted to the soldering to permit the solder to flow to the inner margin. Therefore this margin of one sixteenth inch tends to chill the solder, and absolutely to exclude the solder, acid etc. from the interior of the can. The impurities are thus also prevented from reaching the horn, and the horns are kept clean. The die 65 pinches the outer lap of the tin tight against this marginal portion of the inner lap, which rests on the horn, and thus coöperates to prevent the impurities entering the can or coming in contact with horn, and also insures the production of a good tight joint. It will be understood that the can body edges do not overlap until the body has passed from the shell onto the horn and beyond the gage 30. 32 is a stiffening piece to maintain the gage and parts in position.

Having thus fully described my invention, what I claim and desire to protect by Letters Patent, is:—

1. In a lap-seam body-former for can-bodies, the combination with a substantially cylindrical, hollow, metal shell, of means for wrapping the body blanks around the shell, a suitable carrier and a series of suitable mechanisms supported on the carrier for removing the bodies from the shell, one by one, in rapid succession and for maintaining the edges overlapping, and means for operating the carrier to transfer the bodies to mechanisms for soldering the seam, said shell, being adapted to receive and support only one body at the same time, and being substantially equal in length to the blanks.

2. In a lap-seam body-former for can-bodies, the combination with a substantially cylindrical, hollow, thin metal shell, said shell being suitably supported in a fixed position and having a longitudinal opening from end to end, of means to wrap the can-bodies one by one around the shell with the longitudinal body edges adjacent and parallel, a suitable carrier, a series of substantially cylindrical horns supported on the carrier and of a smaller diameter than the shell, said horns being adapted to be moved through the shell to receive the cylindrical bodies, one by one, from the shell and to transfer the bodies to a mechanism for soldering the seam, and means connected with the horns for maintaining the bodies in position with said edges overlapping while the seam is being soldered.

3. In a lap-seam body-former for can-bodies, the combination with a substantially cylindrical, hollow, thin metal shell, said shell being suitably supported in a fixed position and having a longitudinal opening from end to end, of means to wrap the can-bodies one by one, around the shell, with the longitudinal edges, along which the joint is formed, arranged adjacent and parallel, a suitable carrier, a series of substantially cylindrical horns supported on the carrier and of a smaller diameter than the shell, said horns being adapted to be moved through the shell and to receive the cylindrical bodies, one by one, from the shell and to transfer the bodies to a mechanism for soldering the seam, jaws connected with the horns, and means for swinging said jaws in against the horns to maintain the bodies in position with said edges overlapping, while the seam is being soldered.

4. In a lap-seam body-former for can-bodies, the combination with a substantially cylindrical shell of sufficient length to receive one blank, of means to wrap the body blanks around the shell with the longitudinal edges adjacent, a series of horns to receive the bodies one by one from the shell and carry them rearwardly, means to cause the adjacent edges slightly to overlap, after the bodies have been removed to the horns, and to maintain the bodies in position on the horns, means to flux the joint, means to apply solder to the joint, and means to reheat and finish the joint, said means for fluxing, soldering, wiping and reheating being adapted to operate on the joint while the bodies are moving, and means to strip the bodies from the horns after the joints have been completed, said shell and horns being substantially equal in length and substantially equal in length to the blanks.

5. In a lap-seam body-former for can-bodies, the combination with a suitable frame, of an endless series of trucks, front and rear sprockets adapted to engage with and move the trucks, means to rotate the sprockets, tracks for the trucks, a substantially cylindrical shell fixed on the frame and having a lower, longitudinal opening from end to end, a series of horns supported on posts on the trucks and adapted to pass through the shell and receive the bodies therefrom, said posts being adapted to pass through the opening and to engage with the bodies, jaws journaled on the trucks, means to swing the jaws against the respective horns, when the horns have received the bodies from the shell to maintain the bodies and the joint in proper position for the subsequent operations, separate means to flux, to solder, to wipe and reheat the joints, said separate means operating in succession on the bodies moving rearwardly, a rear bracket, a holding bar supported in said rear bracket and forwardly extending to rest on the joint of the body while the joint is being reheated, a plunger suitably supported and engaging with said bar near its front end, and a spring engaging with said plunger to hold the bar on the joint with a spring tension.

6. In a lap-seam body-former for can-bodies, the combination with a suitable frame, of an endless series of trucks hinged together by axles, front and rear sprockets having pockets to receive the axles of the trucks at the ends to move the series of trucks, means to rotate the sprockets, upper and lower tracks for the trucks, a substantially cylindrical shell fixed on the frame and having a lower, longitudinal opening from end to end, a series of horns supported on posts on the trucks and adapted to pass through the shell and receive the bodies therefrom, said posts being adapted to pass through the opening and engage with the bodies, jaws journaled on the trucks, means to swing the jaws against the respective horns, when the horns have received the bodies from the shell, to maintain the bodies and the joint in proper position for the subsequent operations, separate means to flux, to solder, to wipe and to reheat the joints, said separate means operating in succession on the bodies moving rearwardly, a rear bracket, a holding bar supported in said rear bracket and forwardly extending to rest on the joint of the body while the joint is being reheated, a plunger suitably supported and engaging with said bar near its front end, a spring engaging with said plunger to hold the bar on the joint with a spring tension, a stripping mechanism to strip the bodies from the horns in succession, when the joints have been completed, and an inclined discharge rod to receive the bodies from the stripping mechanism.

7. In a lap-seam body-former for can-bodies, the combination with a suitable supporting frame for the parts, of an endless series of trucks hinged together, tracks on the frame for the trucks, sprockets at the ends adapted to engage with the trucks passing the sprockets, means to rotate the sprockets to move the series of trucks constantly and steadily forward while the various parts of the machine are operating, a substantially cylindrical shell fixed on the frame and having a lower longitudinal opening, posts on the trucks adapted to pass through said opening and strip the can-body from the shell, cylindrical horns on the posts adapted to pass through the shell and receive the bodies therefrom, each horn having a longitudinal top air-space, curved jaws journaled on the trucks below the horns, supplementary tracks on the frame adapted to engage with projections on said jaws to swing in the jaws against the horns with the jaw ends engaging the can-bodies adjacent their longitudinal edges first one jaw to maintain one of said edges against the horn slightly overlapping the air-space, and immediately thereafter the second to maintain the outer one of said edges overlapping the first edge, and means to apply solder to said edges, forming the seam.

8. In a lap-seam body-former for can-bodies, the combination with a substantially cylindrical, hollow, thin metal shell, said shell being suitably supported in a fixed position and having a longitudinal opening from end to end, of means to wrap the can-bodies one by one around the shell, with the longitudinal edges adjacent and parallel, a gage extending rearwardly from the top of the shell between said edges, temporarily to maintain said edges in position, a suitable carrier, a series of substantially cylindrical horns supported on the carrier and of a smaller diameter than the shell, said horns being adapted to be moved through the shell and to receive the cylindrical bodies, one by one, from the shell and carry said bodies rearwardly to a mechanism for soldering the seam, and means connected with the horns for maintaining the bodies in position with said edges overlapping, while the seam is being soldered.

9. In a lap-seam body-former for can-bodies, the combination with a suitable frame, of a substantially cylindrical, thin, metal shell fixed on the frame and having a lower longitudinal opening, a gage extending rearwardly from the top of the shell temporarily to engage with the longitudinal edges of the body to insure their correct positioning for the joint soldering mechanism, a series of trucks adapted to pass through said opening, horns on the posts to pass through the shell and receive the bodies therefrom, jaws journaled on the trucks, and means to swing the jaws against the horns, after the horns have received the bodies and passed beyond the gage, to maintain the bodies in position on the horn with the longitudinal edges overlapping.

10. In a lap-seam body-former for can-bodies, the combination with a suitable supporting frame, of a fixed shell, means to wrap the blanks around the shell to form the bodies, a series of expansible horns, means to move the horns through the shell to receive in succession the bodies, means to expand the horns to maintain the bodies firmly in position, means to flux, solder, and finish the joints of the blanks, means to withdraw the expanding means from the horns when the joints have been completed, and means to strip the bodies from the horns.

11. In a lap-seam body-former for can-bodies, the combination with a suitable supporting frame, of a fixed shell, means to wrap the blanks around the shell, a series of expansible horns, means to move the horns through the shell to receive in succession the bodies, means to expand the horns to maintain the bodies firmly in position, means to flux, solder, and finish the joints of the bodies, means to withdraw the expanding means from the horns when the joints have been completed, means to contract the horns, and means to strip the bodies from the contracted horns.

12. In a lap-seam body-former for can-bodies, the combination with a suitable supporting frame, of a shell fixed in a suitable position on the frame, means to wrap the blanks around the shell into the cylindrical form for the bodies, substantially cylindrical horns, said horns being less in diameter than the shell and formed of two separate parts, means to move the horns through the shell to receive the bodies in succession from the shell, a wedge-like pin arranged between the two parts of the horns, means to move the pin to separate the two parts of the horns and expand the horns, means to solder and secure the seams of the bodies, means to withdraw the wedge-like pin when the joints have been finished, a spring to connect the two parts of the horns and to contract the horns, and means to strip the bodies from the contracted horns.

13. In a lap-seam body-former for can-bodies, means for forming the flat sheets into a cylindrical form with the longitudinal edges adjacent and parallel, said means having in a combination a suitable supporting frame for the parts, a substantially cylindrical, hollow, thin metal shell suitably supported in a fixed position on the frame, said shell having its axis arranged longitudinally of the machine and having a longitudinal opening in its lower portion from end to end, the metal forming the far edge of the opening being turned in at an obtuse angle to prevent the blanks from entering the interior of the shell, lower and upper rollers journaled parallel and adjacent to the shell, and means to rotate said rollers rapidly to wrap the blanks around the shell.

14. In a lap-seam body-former for can-bodies, means for forming the flat sheets into a cylindrical form with the longitudinal edges adjacent and parallel, said means having in a combination, a suitable supporting frame for the parts, a substantially cylindrical, hollow, thin metal sheet suitably supported in a fixed position on the frame, said shell having its axis arranged longitudinally of the machine and having a longitudinal opening in its lower portion from end to end, the metal forming the far edge of the opening being turned in to guide the blanks around the exterior of the shell, and upper rollers journaled in the frame, parallel and adjacent to the shell, means to rotate said rollers rapidly to wrap the blanks around the shell, a leading-bar on the carrier arranged in front of the rollers and having an inclined front face and a lower face extending rearwardly toward the opening between the rollers, and a guide-bar on the carrier, arranged behind the rollers and slightly downwardly inclined from the opening between the rollers, to deflect the blanks downwardly as they pass rearwardly from the rollers, so as to wrap them around the shell.

15. In a lap-seam body-forming machine for can-bodies, means for bending the flat blanks into cylindrical form, a series of substantially cylindrical horns for receiving the bodies so formed and supporting them while the joints are being soldered, trucks supporting the horns, said horns having parallel longitudinal grooves in their upper portions, and means for moving the trucks and horns, means for stripping the cylindrical bodies from the horns, when the joint has been soldered, having endless chains suitably supported, fingers on said chains adapted to move in said horn grooves and engage with the bodies, and means to operate said endless chains so that they will move in the same direction as the horns and at a greater speed.

16. In a lap-seam body-forming machine for can-bodies, means for bending the flat blanks into cylindrical form, a series of substantially cylindrical horns for receiving the bodies so formed and supporting them, while the joints are being soldered, trucks supporting said horns, a bridge piece rearwardly extending from each truck immediately below the horn, each horn having parallel longitudinal grooves in its upper portion, and means for moving the trucks and horns past the soldering mechanism, and means for stripping the cylindrical bodies from the horns, when the joints have been soldered, having in combination a bracket on the frame of the machine near the rear end, transverse bearings on said bracket, parallel stripper shafts journaled in said bearings and extending over the moving horns carrying the bodies having the complete joints, a pair of adjustable sprockets fixed on each shaft in alinement with said horn grooves, endless chains on said sprockets, fingers on said chains adapted to move in said horn grooves and engage with the bodies, and means to operate said endless chains so that their under portions will move in the same direction as the horns and at a greater speed.

17. In a lap-seam body-former for can-bodies, means for forming the flat sheets into a cylindrical form with the longitudinal edges arranged parallel and adjacent, said means having in a combination, a suitable supporting frame for the parts, a lower bracket supported on the rear side of the machine and extending upwardly and toward the front side; a substantially cylindrical, hollow, thin metal shell suitably supported in a fixed position on said bracket and below the portion thereof extending toward the front side, said shell having its axis arranged longitudinally of the machine and having a longitudinal opening in its lower portion from end to end, the metal forming the far edge of said opening being turned in at an obtuse angle to guide the blanks around the exterior of the shell; a lower roller journaled in the lower bracket immediately above the shell; an upper bracket hinged to ears on the lower bracket toward the rear side of the machine and extending toward the front side of the machine over the shell, a carrier vertically adjustable on the upper bracket, a pair of upper screws engaging with the upper bracket and the carrier, to adjust the carrier on the upper bracket, a clamping screw to clamp the carrier in position on the upper bracket; an upper roller journaled in the upper bracket parallel to the lower roller and adapted to rotate in contact therewith, gears on said roller axles to be in mesh when the parts are in operative position, the axes of said rollers being substantially in the same vertical plane, and arranged parallel to and slightly forwardly of the axis of the shell; a horizontal feed table arranged at the front side of the machine in front of the rollers and at a level slightly below the opening there between, a feed mechanism to feed the sheets one by one along the table to the rollers, a leading-bar on the carrier arranged in front of the rollers and having an inclined front face and a lower face extending rearwardly adjacent to the table and toward the opening between the rollers; a guide-bar on the carrier, arranged at the rear side of the rollers, and slightly downwardly inclined from the opening between the rollers to deflect the blanks downwardly as they pass rearwardly from the rollers, to be wrapped around the shell, forked arms on the front side of the upper bracket, screw-threaded bolts hinged to the ears on the lower bracket in line with the arms, sliding collars on the bolts to engage with the forked arms, springs and screw heads on the bolts to retain the collars in position, and means to engage with the gears to rotate the rollers rapidly in opposite directions to receive the blanks from the feeding mechanism and to wrap around the shell, substantially as shown.

18. In a lap seam body forming machine for can bodies having a suitable supporting frame for the parts, a cylindrical shell with a longitudinal opening from end to end, and means to wrap the blanks around the shell with the longitudinal edges slightly overlapping for the joint, means for removing the bodies from the shell and maintaining them in position while the joints are being soldered and finished, having in combination the upper and lower truck tracks, sprocket wheels at the ends of the frame arranged at a lower level than the lower tracks and having peripheral pockets, means to rotate the sprockets, series of trucks having front and rear perforated ears, axles fitted to said ears to connect the trucks by hinge joints to form an endless series, rollers on the axles engaging with the sprocket pockets whereby the series of trucks is moved forward, shoes on the trucks to engage with the upper tracks, a post at the front of each truck to pass through the opening in the shell and strip the blank therefrom, the main member of a substantially cylindrical horn extending rearwardly therefrom, a loose horn member fitted to the main member and connected thereto by tension springs tending to contract the horn, said members being formed to leave a longitudinal air space between them at the top of the horn, and each member provided with a longitudinal groove on opposite sides of said space and parallel thereto and at equal distances therefrom, hard steel screws arranged in the interior of the horn, one on each horn member, having beveled heads arranged adjacent, an expanding pin arranged in a bearing in the main horn portion and having a tapered point adapted to be forced between the heads, a bell-crank lever having its upper arm connected to said pin, a threaded pin hinged to the crank, and extending through an opening in said upper arm, a nut fitted to the threaded pin, a spring arranged between said nut and the upper arm of the lever and adapted to force the expanding pin forward to expand the horn, a roller on the lower arm of the lever adapted to engage with a suitable track, or abutment, near the rear end of the machine to raise the lower arm and retract the expanding pin, to permit the horn to contract and the body to be stripped therefrom, after the soldering of the joint has been completed, jaws curved to correspond to the form of the horn and journaled on each truck below the horn, pins fitted adjustably, or rotatably, in the outer surface of the jaws, set-screws to maintain said pins in position, axles arranged eccentrically on the pins, jaw-rollers on the axles, tracks on the frame having high points, one in advance of the other, arranged first to close the first jaw, to engage with the can body and press it against the horn with one longitudinal edge overlapping the air space, and immediately thereafter to close the second jaw to engage with the other edge and press it down on and overlapping the first edge, and beveled dies in the ends of the jaws to engage with the can body, the die on the end of the second jaw being adjustable, so as to be arranged to extend a greater or less distance from the jaw, substantially as described and shown.

19. In a lap-seam body-former for can bodies, the combination with a substantially cylindrical, hollow, thin metal shell, adapted to receive the can blanks one by one, of means for wrapping the blanks around the shell, one by one, a suitable carrier, a series of elements supported on the carrier and adapted each to remove a body from off the shell, means supported on the carrier for retaining the bodies on said elements with the longitudinal edges overlapping, and means for operating the carrier to transfer the bodies to mechanisms for soldering the longitudinal seam.

20. In a machine of the character described, the combination with a substantially cylindrical shell, of a pair of rollers arranged substantially in contact and with their axes parallel to the shell axis, said rollers being placed adjacent to the shell and at a higher level, means to deliver the blanks to the rollers, means to rotate the rollers to receive the blanks from the delivery means, and wrap them around the shell, a carrier suitably supported above the rollers, a leading bar on the carrier arranged between the delivery means and the rollers and adjacent to the line of contact between the rollers, a downwardly inclined guide bar arranged adjacent to the line of contact between the rollers at the opposite side from the leading bar, and means to adjust the carrier and bars with reference to the rollers.

21. In a machine of the character described, a substantially cylindrical shell, means to wrap the blanks around the shell one by one to form the can bodies, a series of horns and means to move the horns through the shell, to receive the bodies one by one from the shell, leaving the shell free to receive another blank after each body has been stripped therefrom.

22. In a machine of the character described, a thin metal, hollow shell, having a longitudinal opening, a series of trucks, a post on each truck, a horn on each post, means to wrap the blanks around the shell, one at a time, and means to move the trucks forward and the horns through the shell, with the posts moving in the shell opening, to strip the formed blanks from off the shell, one blank on each horn.

23. In a machine of the character described, the combination with a substantially cylindrical shell, of means to wrap the blanks around the shell to form the bodies, a series of substantially cylindrical horns, means to move the horns through the shell to strip the bodies therefrom, said horns being formed of two parts, means to separate said parts to hold the body tight on the horn, and means to withdraw said separating means to permit the horn to contract and loosen the body.

24. In a lap-seam body-former for can bodies, the combination with a hollow shell, of means to wrap the blanks for the bodies around the shell with the two longitudinal edges substantially in contact, a series of horns, means to move the series of horns through the shell to receive the bodies stripped from off the shell, said horns being slightly less in diameter than the shell so as to be able to pass through the shell, and means connected with each horn to compress the body on the horn, causing said longitudinal edges to slightly overlap, and to maintain the body in position while the seam is being soldered.

25. In a lap-seam body-former for can bodies, the combination with a hollow, thin metal shell, suitably supported in a fixed position, of means to wrap the blanks one by one around the shell with the longitudinal edges adjacent and parallel, a suitable carrier, means to move the carrier continually, a series of horns on the carrier, said horns being adapted to pass through the shell and receive, one by one, the wrapped blanks therefrom, a pair of jaws journaled adjacent to each horn on the carrier said jaws being formed to correspond to the form of the carrier, and means to swing said jaws in against the horn to cause the edges of the blank slightly to overlap and to hold the blank firmly on the horn.

26. In a machine of the character described, means for curling the blanks one by one into substantially cylindrical form, means for temporarily sustaining the blanks so formed, a series of constantly moving elements adapted to receive the curled blanks removed by suitable means in succession from the sustaining means, said elements being provided with a longitudinal groove or air space, and means for clamping the blanks on said elements with the joint edges of each blank overlapping and at least one edge spanning the groove.

27. In a lap-seam body former for can bodies, the combination with means for curling the blanks and means for temporarily sustaining the blanks so curled, of a series of constantly moving, substantially cylindrical horns to receive the curled blanks one by one from the sustaining means, said horns being each provided with a longitudinal groove or air space in the upper portion of the curved surface, and means for clamping the blanks on said horns with the joint edges slightly over-lapping.

28. In a machine of the character described, the combination with a shell temporarily to sustain the blank curled into substantially a cylindrical form, said shell being closed above and having an opening in its lower portion, of means for keeping the joint edges of the curled blank separate while on the shell, and means for removing the curled blanks in succession from the shell.

29. In a lap-seam body former for can bodies, the combination with means for curling the blanks and means for temporarily sustaining the blanks so curled, of a series of constantly moving, substantially cylindrical horns, arranged to receive the curled blanks in succession from the sustaining means, and means to clamp the blanks on the respective horns with the joint edges overlapping, said horns being arranged in succession with their axes substantially in alinement, and the movement of said horns being substantially in the line of the axes.

30. In a machine of the character described, the combination with means for successively curling the blanks into substantially cylindrical bodies and holding the same temporarily supported, of a series of traveling trucks, a horn on each truck, said horns being moved in succession into the supported bodies, jaws on each truck, and means for closing said jaws to clamp the bodies on the horns, with the joint edges of the bodies overlapping in position for the operations of soldering.

31. In a can-body forming machine, the combination with means for temporarily sustaining the body blank formed into substantially cylindrical form, of an element for removing the blank from said means, a pair of jaws for clamping the blank on said element, means to operate one jaw first to clamp down one joint edge of the blank, and means to operate the other jaw next to clamp down the other joint edge over-lapping the first joint edge.

32. In a machine of the character described, the combination with means for curling the blanks into substantially cylindrical form, means for temporarily sustaining the blanks so formed, a series of substantially cylindrical horns, said horns being formed with longitudinal grooves or air spaces, means to move the horns to receive the blanks, one on each horn, from the sustaining means, a pair of jaws pivotally supported adjacent to each horn, one jaw on each side, said jaws being normally open, and means to close said jaws on the horns to clamp the blanks in position, said closing means operating to close one jaw before the other, first clamping one joint edge of the blank to span the groove and second to clamp the other joint edge slightly overlapping the first edge.

33. In a lap-seam body former for can bodies, the combination with means for curling the blanks and an element for temporarily sustaining the blanks, so curled, of a gage arranged adjacent to said element to maintain the joint edges parallel and temporarily separated, and to fix the position of the joint, and a series of constantly moving elements arranged to move adjacent to the sustaining element and adapted to remove the blanks one by one from the latter.

34. In a lap-seam body former for can bodies, the combination with means for curling the blanks and an element for temporarily supporting the blanks so curled, of a gage arranged adjacent to the upper part of said element to maintain the joint edges parallel and temporarily separated, and to fix the position of the joint, a series of constantly moving substantially cylindrical horns arranged to move adjacent to the supporting element to receive the blanks one by one from the latter, said horns being formed in the upper portion of their curved surfaces with longitudinal grooves arranged substantially in alinement with the gage, and means for clamping the blanks on the horns with the joint edges overlapping and at least one joint edge spanning the groove.

35. In a lap-seam body-former for can bodies, the combination with a fixed metal shell, of means for curling the blanks and delivering them on to the shell, and a gage arranged at the upper portion of the shell to maintain the joint edges of the blanks parallel and separated.

36. In a lap-seam body-former for can bodies, the combination with a fixed metal shell, of a gage extending longitudinally along the upper portion of the shell and rearwardly therefrom to maintain the joint edges of the blanks temporarily separated and parallel, means for curling the blank around the shell, substantially cylindrical horns of a diameter corresponding with the diameter of the body to be formed, means for moving the horns continuously through the shell to receive the bodies therefrom, one by one, and means to clamp the bodies on the horns.

37. In a lap-seam body-former for can bodies, the combination with a fixed element, of a gage-bar extending longitudinally along the top of said element and rearwardly therefrom, said element being open below, means for curling the blanks around said element to bring their opposite joint edges into engagement with the opposite sides of the gage to maintain said edges separated and parallel, a series of constantly moving horns, means to move the horns below the gage bar to receive the bodies from said element one by one, and means to clamp the blanks on the respective horns.

In testimony whereof I have signed my name to this specification in the presence of two subscribing witnesses.

LOUIS C. KRUMMEL.

Witnesses:
AGNES KRUMMEL,
LILY RICHTER.